United States Patent
Sagiraju

(10) Patent No.: US 10,540,162 B2
(45) Date of Patent: *Jan. 21, 2020

(54) GENERATING SERVICE IMAGES HAVING SCRIPTS FOR THE DEPLOYMENT OF SERVICES

(71) Applicant: HEWLETT PACKARD ENTERPRISE DEVELOPMENT LP, Houston, TX (US)

(72) Inventor: Krishna C. Sagiraju, San Jose, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/192,547

(22) Filed: Nov. 15, 2018

(65) Prior Publication Data

US 2019/0087167 A1 Mar. 21, 2019

Related U.S. Application Data

(63) Continuation of application No. 15/270,797, filed on Sep. 20, 2016, now Pat. No. 10,146,519.

(51) Int. Cl.
*G06F 8/61* (2018.01)
*G06F 8/30* (2018.01)
*H04L 29/08* (2006.01)

(52) U.S. Cl.
CPC .......... *G06F 8/63* (2013.01); *G06F 8/31* (2013.01); *H04L 67/34* (2013.01)

(58) Field of Classification Search
CPC ... G06F 8/63; G06F 8/31; G06F 9/445; H04L 41/5054; H04L 41/5096; H04L 67/34; H04L 67/306
See application file for complete search history.

(56) References Cited

U.S. PATENT DOCUMENTS

| 7,650,331 B1* | 1/2010 | Dean ..................... G06F 9/5066 712/203 |
| 8,108,855 B2 | 1/2012 | Dias |
| 8,572,138 B2* | 10/2013 | Sundar ..................... G06F 8/60 707/828 |

(Continued)

OTHER PUBLICATIONS

Talwar et al., "Approaches for Service Deployment", 2005, IEEE Computer Society (Year: 2005).*

(Continued)

*Primary Examiner* — Wei Y Zhen
*Assistant Examiner* — Junchun Wu
(74) *Attorney, Agent, or Firm* — Hewlett Packard Enterprise Patent Department

(57) ABSTRACT

Disclosed herein provides enhancements for generating images for deployment in processing environments. In one implementation a method of preparing service images for large scale data processing environments includes identifying a first service image, and identifying metadata that defines runtime requirements for deploying the service in data processing environments. The method further provides generating scripts for deploying the service based on the metadata, and generating a second service image for the service, wherein the second service image includes the scripts.

20 Claims, 7 Drawing Sheets

(56) References Cited

U.S. PATENT DOCUMENTS

| | | | |
|---|---|---|---|
| 8,997,078 B2* | 3/2015 | Spivak | G06F 9/5055 |
| | | | 717/168 |
| 9,043,767 B2* | 5/2015 | Spivak | G06F 9/5055 |
| | | | 717/148 |
| 9,524,183 B1* | 12/2016 | Phelan | G06F 9/45558 |
| 2003/0131075 A1* | 7/2003 | Bear | H04L 41/5054 |
| | | | 709/219 |
| 2005/0097512 A1 | 5/2005 | VanGilder | |
| 2009/0083404 A1 | 3/2009 | Lenzmeier | |
| 2013/0055292 A1 | 2/2013 | Pierson | |
| 2013/0219362 A1 | 8/2013 | Cai | |
| 2013/0268799 A1* | 10/2013 | Mestery | H04L 67/10 |
| | | | 714/4.2 |
| 2014/0059310 A1* | 2/2014 | Du | G06F 3/065 |
| | | | 711/162 |
| 2015/0020061 A1* | 1/2015 | Ravi | G06F 8/65 |
| | | | 717/172 |
| 2015/0193535 A1 | 7/2015 | Balmin | |
| 2015/0381711 A1* | 12/2015 | Singh | H04L 41/0813 |
| | | | 709/221 |
| 2016/0154629 A1* | 6/2016 | Noens | G06F 8/30 |
| | | | 717/107 |
| 2017/0085419 A1* | 3/2017 | Zhang | H04L 41/5051 |
| 2017/0208138 A1* | 7/2017 | Baxter | H04L 67/16 |

OTHER PUBLICATIONS

Hosono et al., "A Lifetime Supporting Framework for Cloud Applications", 2010, IEEE (Year: 2010).*

Koliopoulos et al., "A Parallel Distributed Weka Framework for Big Data Mining using Spark", 2015, IEEE (Year: 2015).*

Wong et al., "A unified framework for the deployment, exposure and access of HPC applications as services in clouds", 2013, Elsevier (Year: 2013).*

* cited by examiner

GENERATING SERVICE IMAGES HAVING SCRIPTS FOR THE DEPLOYMENT OF SERVICES

RELATED APPLICATIONS

This Application is a continuation of, and claims priority to, U.S. application Ser. No. 15/270,797, filed on Sep. 20, 2016, and entitled "Generation and Deployment of Scripts for Large Scale Processing Framework Services," which is hereby incorporated by reference in its entirety.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various large-scale processing applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, Linux containers, such as Docker containers, jails, or other similar types of virtual containment nodes.

To deploy the large-scale processing frameworks in a computing environment, administrators and users are often required to manually configure the frameworks to operate on the physical and virtual nodes of a cluster. This manual configuration of each of the processing frameworks can be time consuming and cumbersome as each iteration of the processing frameworks may take different actions for the configuration, such as determining addressing and computing resource requirements. This configuration difficulty is further compounded with the use of edge services, such as Splunk, Graylog, Platfora, or some other visualization and monitoring services, which communicate with the large-scale processing framework nodes within the cluster to provide control and feedback to administrators and users associated with the processing cluster. In particular, these edge services may require configuration information not only for the edge service, but also configuration information for the associated large-scale processing cluster.

OVERVIEW

The technology disclosed herein provides enhancements for generating images for deployment in processing environments. In one implementation, a method of preparing service images for large scale data processing environments includes identifying a first service image and identifying metadata that defines runtime requirements for deploying the service in data processing environments. The method further provides generating scripts for deploying the service based on the metadata, and generating a second service image for the service, wherein the second service image includes the scripts.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
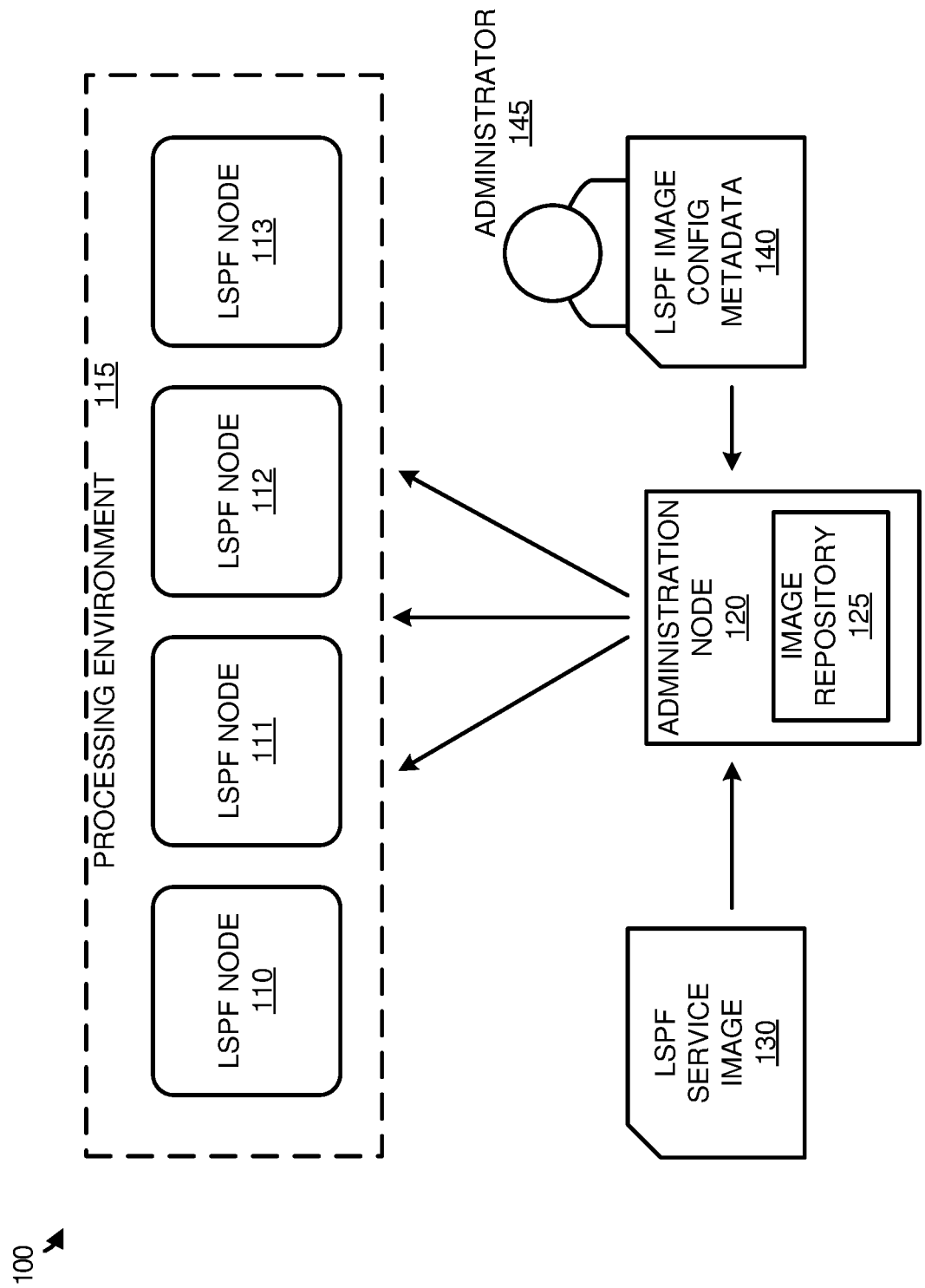
FIG. 1 illustrates a computing environment to generate a large-scale processing framework from a service image and service image metadata according to one implementation.

Large-scale processing environments (LSPEs) may employ a plurality of physical computing systems to provide efficient handling of job processes across a plurality of virtual data processing nodes. These virtual nodes may include full operating system virtual machines, Linux containers, Docker containers, jails, or other similar types of virtual containment nodes capable of executing large-scale processing frameworks (LSPFs). In addition to the virtual processing nodes, data sources are made available to the virtual processing nodes that may be stored on the same physical computing systems or on separate physical computing systems and devices. These data sources may be stored using versions of the Hadoop distributed file system (HDFS), versions of the Google file system, versions of the Gluster file system (GlusterFS), or any other distributed file system version—including combinations thereof. Data sources may also be stored using object storage systems such as Swift.

To assign job processes, such as Apache Hadoop processes, Apache Spark processes, Disco processes, or other similar LSPF job processes to the host computing systems within a LSPE, a control node may be maintained that can distribute jobs within the environment for multiple tenants. A tenant may include, but is not limited to, a company using the LSPE, a division of a company using the LSPE, or some other defined user group of the LSPE. In some implementations, LSPEs may comprise private serving computing systems, operating for a particular organization. However, in other implementations, in addition to or in place of the private serving computing systems, an organization may employ a cloud environment, such as Amazon Elastic Compute Cloud (Amazon EC2), Microsoft Azure, Rackspace cloud services, or some other cloud environment, which can provide on demand virtual computing resources to the organization. Within each of the virtual computing resources, or virtual machines, provided by the cloud environments, one or more virtual nodes may be instantiated that provide a platform for the large-scale data processing. These nodes may include containers or full operating system virtual machines that operate via the virtual computing resources. Accordingly, in addition to physical host machines, in some implementations, virtual host machines may be used to provide a host platform for the LSPF nodes.

In the present implementation, to efficiently deploy the LSPF services within the network, images are created that include scripts to manage the runtime operations required for executing the service within the environment. In particular, these scripts may be responsible for gathering internet protocol (IP) addressing information for the services, processing resource information for the services, or any other similar information for the service. Further, in some examples, the scripts may be responsible for managing the movement of files to their destination within the processing environment, and replacing objects in the files for the service with information that can only be obtained at runtime (such as the addressing information, and memory allocation).

To generate the images with the scripts, an administrator of a particular LSPE or a developer of the LSPF service may specify, to an administration system, a first image that is to be converted into a second image with scripts for deploying the service in a LSPE. Once the first image is identified for the service, the administrator or developer may generate one or more metadata files that describe runtime requirements for deploying the service within a LSPE. This metadata may include IP addressing requirements for the service, such as the IP addresses that will be allocated to the service, memory requirements for the service, such as the amount and/or location of the memory addresses that will be allocated to the service, the processing requirements, such as the number of cores that will be allocated to the service, or any other similar processing or addressing information requirement for the service. Based on the information in the one or more metadata files, scripts may be generated that can automate, at least partially, the operations of deploying the service within a LSPE. For example, an administrator may generate metadata that indicates that the service requires IP addressing information for the nodes that will be allocated to the service, memory address/size information for the nodes that will be allocated to the service, and any other similar information related to the service. Based on the metadata information, scripts are generated by the administration system to identify the defined requirements of the administrator and deploy the service within a computing environment. Once the scripts are generated, a second image may then be generated that includes the scripts for deploying the service within an environment. This image may then be added to an available repository, permitting a user to select the required service, and deploy the service in a particular environment.

For example, if a new version of Cloudera were generated, the base image may be provided to the administration system alone with metadata that defines requirements for deploying Cloudera within a large-scale processing environment with other nodes. Based on the metadata a second Cloudera image may be generated with scripts, wherein the scripts may identify the required information defined in the metadata, and apply the identified information to deploy Cloudera service within a processing environment. For example, a script may be generated that identifies the IP address allocated to the Cloudera service, and configures the Cloudera service to communicate between the nodes based on the allocated IP addresses.

FIG. 1 illustrates a computing environment 100 to generate a LSPF service image from a first service image and service image metadata according to one implementation. Computing environment 100 includes processing environment 115, administration node 120, LSPF service image 130, and LSPF image configuration metadata 140, wherein the metadata is defined by administrator 145. Processing environment 115 is an example of a LSPE described herein, and includes LSPF nodes 110-113 that may execute as virtual nodes on one or more physical computing systems. This computing system may include desktop computing systems, server computing systems, or any other similar physical computing system capable of providing a platform for LSPF nodes 110-113.

In operation, administrator 145 may select a base LSPF service image 130 that is desired to be instantiated in a processing environment. Administrator 145 may comprise an administrator specific to processing environment 115 or may comprise a developer that distributes images to a plurality of processing environments. Once the base image is identified, administrator 145 may generate LSPF image configuration metadata 140, which identifies runtime requirements that need to be identified before the LSPF service can be deployed within an environment. For example, a LSPF service may be required to identify the IP addresses associated with the nodes allocated to the service. Once the metadata is generated and provided to administration node 120, often in the form of one or more metadata files, the metadata is used to generate a second image of the LSPF service, and store the image in image repository 125. After being generated and stored, administration node 120 may deploy the image to one or more LSPF nodes in processing environment 115.

Figure 2:
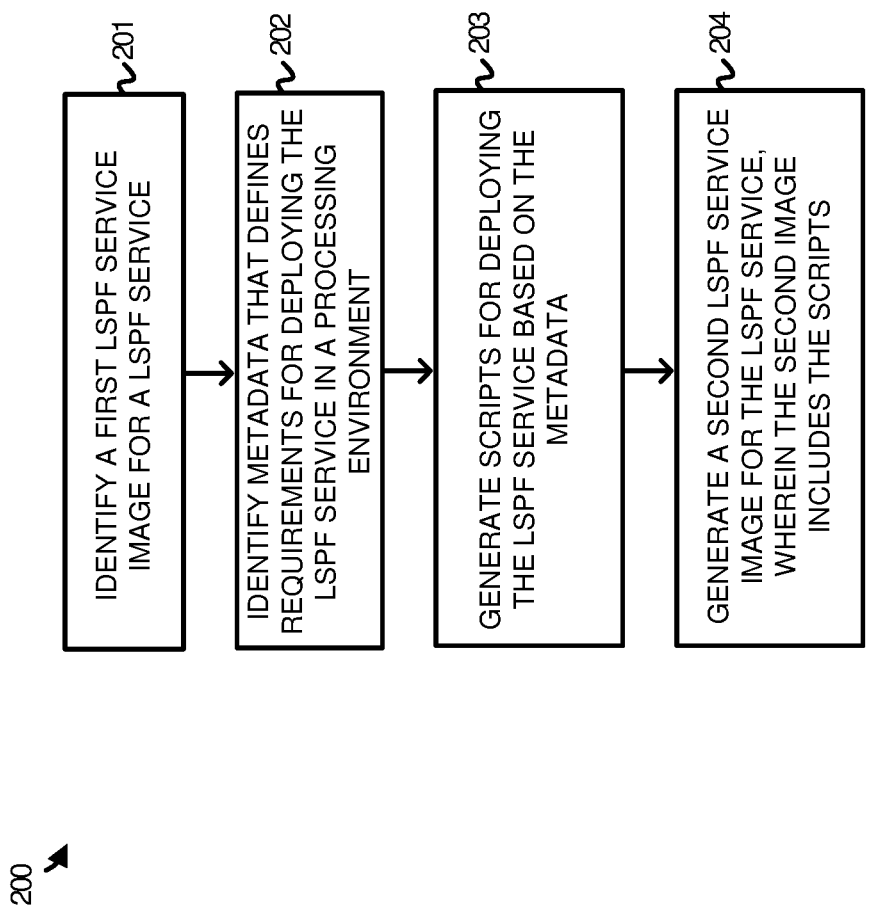
FIG. 2 illustrates a method of generating a large-scale processing framework service image for deployment in a processing environment according to one implementation.

To further demonstrate the operations of computing environment 100, FIG. 2 is provided. FIG. 2 illustrates a method 200 of generating a LSPF service image for deployment in a processing environment according to one implementation. The operations of FIG. 2 are described in the paragraphs that follow with reference to systems and objects of computing environment 100 from FIG. 1.

As illustrated in FIG. 2, the method begins by identifying a first LSPF service image for a LSPF service (201), and identifying metadata that defines requirements for deploying the LSPF service in a processing environment (202). Once identified, the method further generates scripts for deploying the LSPF service based on the metadata (203), and generates a second LSPF service image for the LSPF service, wherein the second image includes the scripts for deployment (204).

Referring to the example of FIG. 1, LSPF service image 130 is provided to administration node 120, along with LSPF image configuration metadata 140. LSPF image configuration metadata 140 includes runtime requirements to be identified about processing environment 115 before the service can be deployed in the environment. These requirements may include, but are not limited to, addressing information that will be provided to the service when it is deployed within processing environment 115, memory and processing allocation that will be provided to the service when it is deployed within processing environment 115, or any dependency information about other services operating in processing environment 115. For example, administrator 145 may provide metadata that indicates that the new service is required to identify the IP addresses that will be allocated to the service, and may further specify that the new service is required to identify memory addresses that are allocated to the service when it is deployed in a processing environment.

Once the first image and the metadata is provided to administration node 120, configuration scripts are generated based on the defined metadata, capable of automating at least a portion of the deployment of the service within a processing environment. In particular, these scripts may provide operations to determine the IP addresses applicable to the service, the memory resources applicable to the service, the processing resources applicable to the service, or any other similar requirements for the service. Further, based on the information determined for the processing environment, the scripts may be responsible for moving files for the service to appropriate locations on processing nodes, placing IP addresses and other similar information within open fields in the files on the processing nodes, and other similar deployment operations with the information determined for processing environment 115.

In some implementations, the information obtained about a specific processing environment may be defined by the administrator or user deploying the particular service. For example, the administrator or user of an environment may be provided with a user interface that permits the user to select the service image for deployment and the amount of processing resources to be allocated to the service. Once the user provides selections via the user interface, administration node 120 may execute the provided scripts to determine IP addresses for the services, processing core allocations, and other similar information based on the preferences of the administrator. Accordingly, if the user required four nodes to provide the processing operations for the service, administration node 120 may execute the scripts to identify IP addresses for the four nodes, memory resources allocated to the four nodes, or any other similar attribute based on the preferences of the administrator deploying the service into processing environment 115.

Once the configuration scripts are generated for LSPF service image 130 based on the LSPF image configuration metadata 140 provided by administrator 145, a second service image is generated and placed in image repository 125, wherein the second service image includes the scripts for the deployment operations. In particular, image repository 125 permits a user or administrator associated with processing environment 115 to select an image with the associated scripts and deploy the image based on selected preferences and the current state of the processing environment. Accordingly, an administrator of processing environment 115 may be provided a user interface by administration node 120, wherein the user interface permits the administrator to select a service image from image repository 125, as well resources that should be made available to the service when it is deployed in processing environment 115. These resources include the number of nodes for the service, the number of processing cores for the service, the amount of memory for the service, any storage repositories that should be made available to the service, or any other similar resource selections. Further, the user may also be able to select supplementary service images that can work alongside a first image in processing environment 115. For example, an administrator may desire to execute a Splunk service in conjunction with a Hadoop cluster service. Accordingly, when Splunk is deployed, the scripts for the Splunk service may also be configured to retrieve configuration information for the Hadoop cluster, such as IP addresses for the Hadoop cluster, the number of nodes for the Hadoop cluster, any storage repositories made available to the Hadoop cluster, or any other similar information. Once the information is obtained by that administration node, the scripts may be used to deploy the service, wherein deploying the service may include moving files to their appropriate location on the nodes, and replacing any variables (such as IP address variables, memory location variables, and the like) in the files to make the application executable in processing environment 115.

Figure 3:
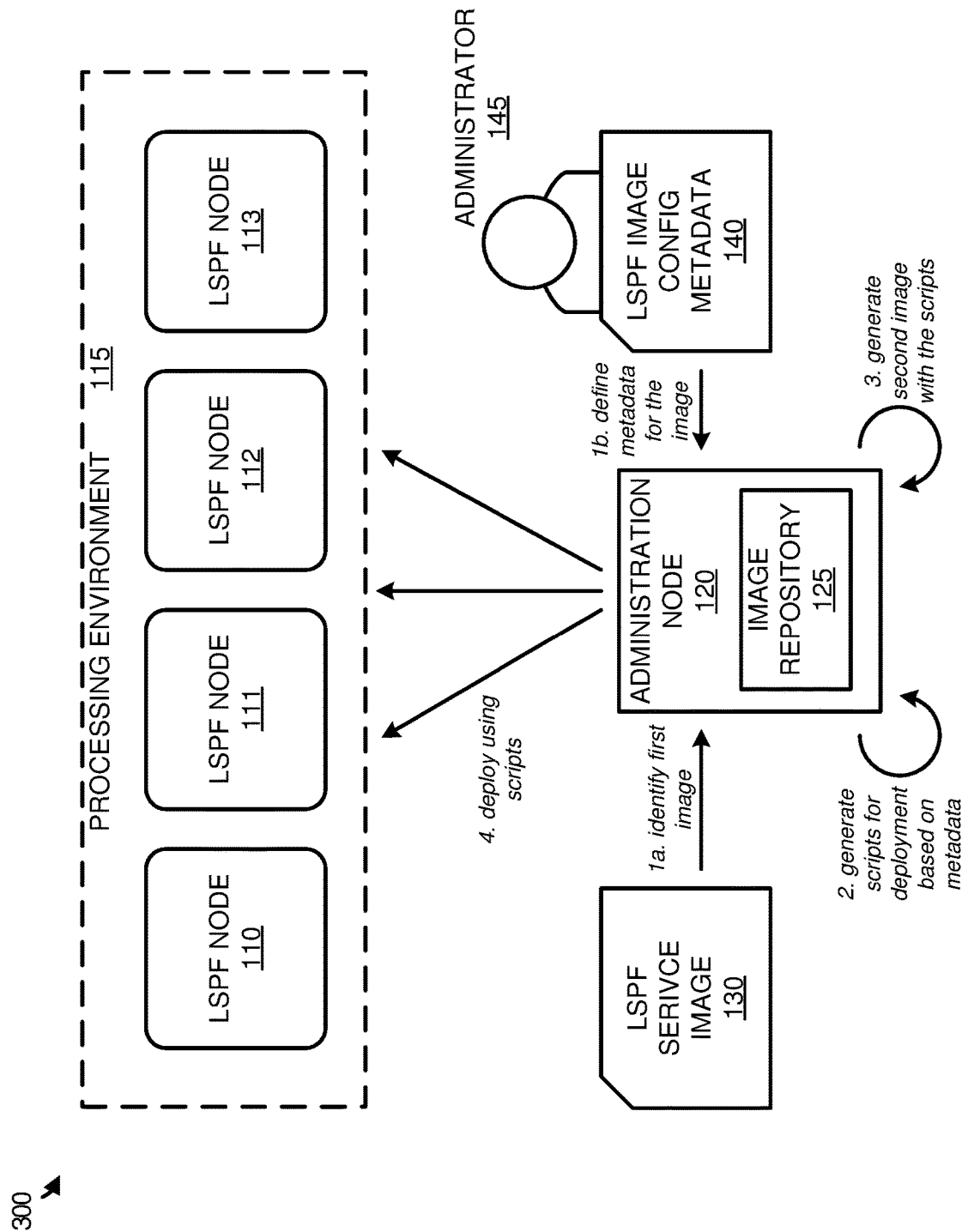
FIG. 3 illustrates an operational scenario of generating and deploying a large-scale processing framework service image according to one implementation.

Referring now to FIG. 3, FIG. 3 illustrates an operational scenario 300 of generating and deploying a large-scale processing framework service image according to one implementation. Operational scenario 300 includes systems and elements from computing environment 100 of FIG. 1.

As depicted, at step 1*a,* administration node 120 identifies a first image corresponding to LSPF service image 130. This image may comprise a Cloudera service image, a Spark service image, a Splunk service image, a Cassandra service image, or some other similar LSPF service image. In addition to identifying the service image, administration node 120, at step 1*b,* identifies defined configuration metadata for the image, wherein the metadata includes LSPF image configuration metadata 140 from administrator 145. In some implementations, in retrieving LSPF image configuration metadata 140, administrator 145 may generate one or more metadata files, wherein the files define characteristics that must be identified for processing environment 115, or any other similar processing environment, before a service can be deployed. The characteristics include addressing characteristics for nodes allocated to the service, and processing resource characteristics for node allocated to the service, among other characteristics, including various combinations thereof.

Once the first image is identified along with the metadata, administration node 120 may generate, at step 2, scripts for deploying LSPF service image 130 based on the metadata provided by administrator 145. These scripts are used to identify the required information defined by the metadata, provide the required information to the files for the service, and move the files into locations, such that the service can operate in a desired processing environment. After the scripts are generated, at step 3, a second image is generated with the scripts, which can be placed in an image repository 125 with other LSPF service images. Once the second image is placed in an image repository, administration node 120 may be used to deploy, at step 4, the image in a processing environment 115.

In at least one implementation, to deploy the second image stored in image repository 125, a user or administrator associated with the processing environment may select the desired image and, in some examples, provide preferences for the particular deployment. These preferences may include the number of processing nodes for the service, the amount of processing resources for the service, any storage repositories (HDFS, GFS, etc.) available to the service, or any other similar preference. Once the image is selected along with any of the preferences selected by the end user, the scripts included with the image may be used to move files into their appropriate location in processing environment 115, and update variables in the files based on the determined runtime information. These variables may include variables directly input by the user when requesting the service, and may further include variables automatically determined by administration node 120. For example, if the user defined that two nodes should be used in operating the service, administration node 120 may assign or generate two nodes in processing environment 115, and allocate IP addresses to the nodes. Once the addresses are allocated, the addresses may be identified by the configuration scripts for the image and provided to the appropriate operations and files of the service to implement the desired operation. Thus, rather than requiring an administrator to generate any of the scripts for a particular service, metadata files, which may be smaller in size, can be used to generate the script files necessary to deploy a particular LSPF service.

Although illustrated in the examples of FIG. 1-3 with the administrator directly providing the configuration metadata to the administration node for processing environment 115, it should be understood that an administrator may generate the image with the configuration scripts using a computing system or device that is not capable of directly deploying the image in processing environment 115. For example, a developer of a service may generate an image with the required scripts and upload the image to an online database. From the database, administrators with separate processing environments may be capable of selecting (and downloading) the image to be applied to a local processing environment. Consequently, a centralized database of images may be created that can be accessed or provided at least partially to administrators and users of individual processing environments as required by the individual processing environments.

Figure 4:
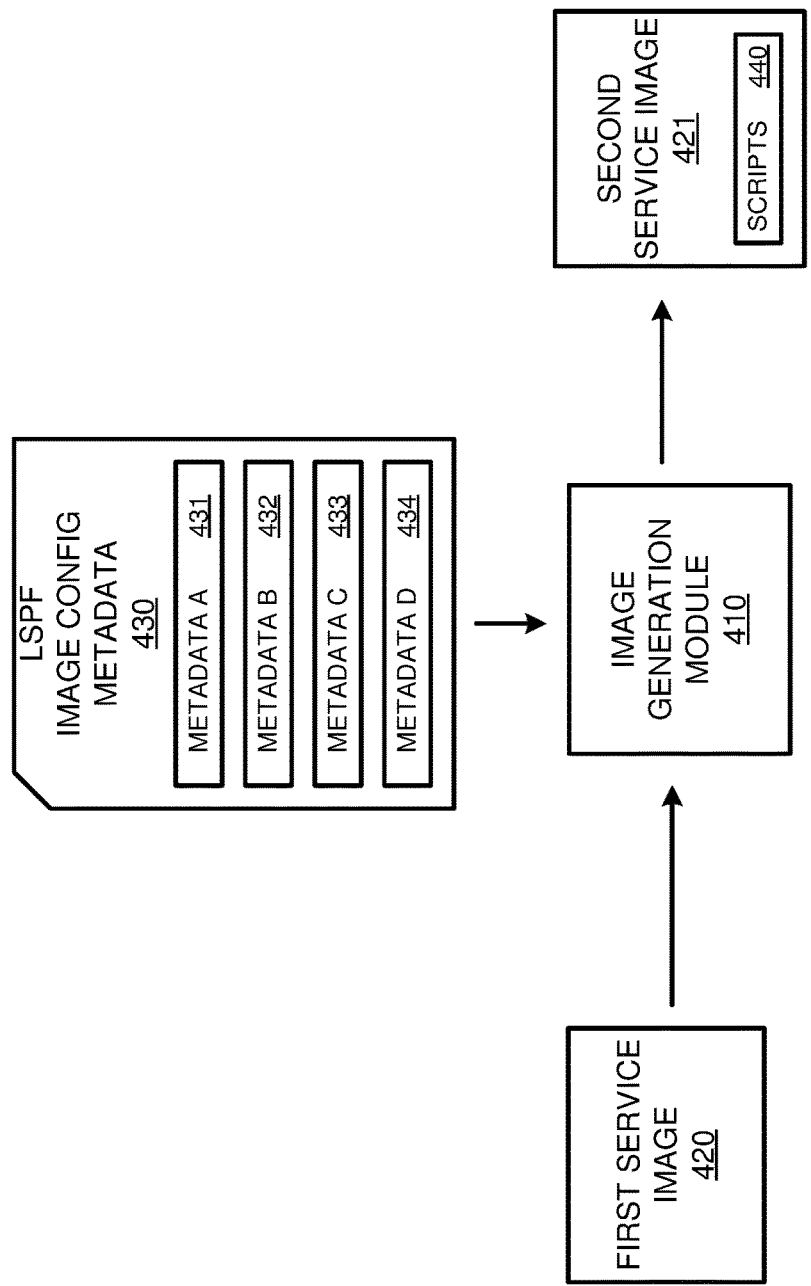
FIG. 4 illustrates an overview of generating a large-scale processing framework service image according to one implementation.

FIG. 4 illustrates an overview 400 of generating a LSPF service image according to one implementation. Overview 400 includes image generation module 410, first service image 420, second service image 421, and LSPF image configuration metadata 430. LSPF image configuration metadata 430 includes metadata A-D 431-434, and second service image 421 includes scripts 440.

As described herein, to deploy a service within a LSPF processing environment, configuration information is identified at runtime of the particular service. This information may include processing resources that are to be provided to the service, addresses that are to be provided to the service, among other runtime information. Here, to ensure that each of the services is provided with the required runtime information, scripts are generated and included with the image, such that the scripts may retrieve and implement the required runtime information with the service.

In the particular example of FIG. 4, to generate scripts 440 for a service image, image generation module 410 is provided. Image generation module 410 may be implemented as a software module on a developers computing system or may be implemented as a software module on an administrators computing system for a particular LSPE. This software module permits the developer or administrator to provide a first service image, and metadata that defines runtime requirements for deploying the particular image within a processing environment. Based on the metadata, a second image may be generated with scripts to provide the appropriate runtime operations. Here, first service image 420 is specified by the administrator to be generated with new scripts for deploying the service in a computing environment for large scale data processing. In addition to identifying the first service image 420, the developer or administrator further provides LSPF image configuration metadata 430, wherein the metadata includes metadata objects A-D 431-434. These metadata objects correspond to runtime requirements for the service to be deployed in a computing environment, and may include addressing requirements for the particular service, processing allocation requirements to the service (RAM, processing cores, and the like), as well as any other similar resource allocation information for the particular service.

Further, in some examples, metadata objects 431-434 may correspond to runtime information that is determined for other co-executing services that are to be executed within the computing environment. For instance, in some implementations, first service image 420 may correspond to a Splunk image that works in conjunction with a Hadoop cluster in a processing environment. Consequently, the Splunk image may be required to retrieve information about the Hadoop image prior to executing, such as addressing information for the Hadoop nodes, and data repository information for at least one repository made available to the Hadoop nodes of the cluster.

Once first service image 420 and LSPF image configuration metadata 430 are provided to image generation module 410, image generation module 410 may generate second service image 421 with scripts 440. In some implementations, LSPF configuration metadata 430 may be provided in the form of one or more metadata files, wherein the metadata files use an application program interface (API) to define the runtime requirements for the service image. Based on the information in the metadata files, image generation module 410 may translate the metadata in the API format into the required scripts for the service. Consequently, rather than requiring a developer or an administrator to generate the scripts to deploy a particular service, the developer or administrator may provide metadata in an API format, which can be translated into the required scripts for deploying the service within a particular computing environment.

Figure 5:
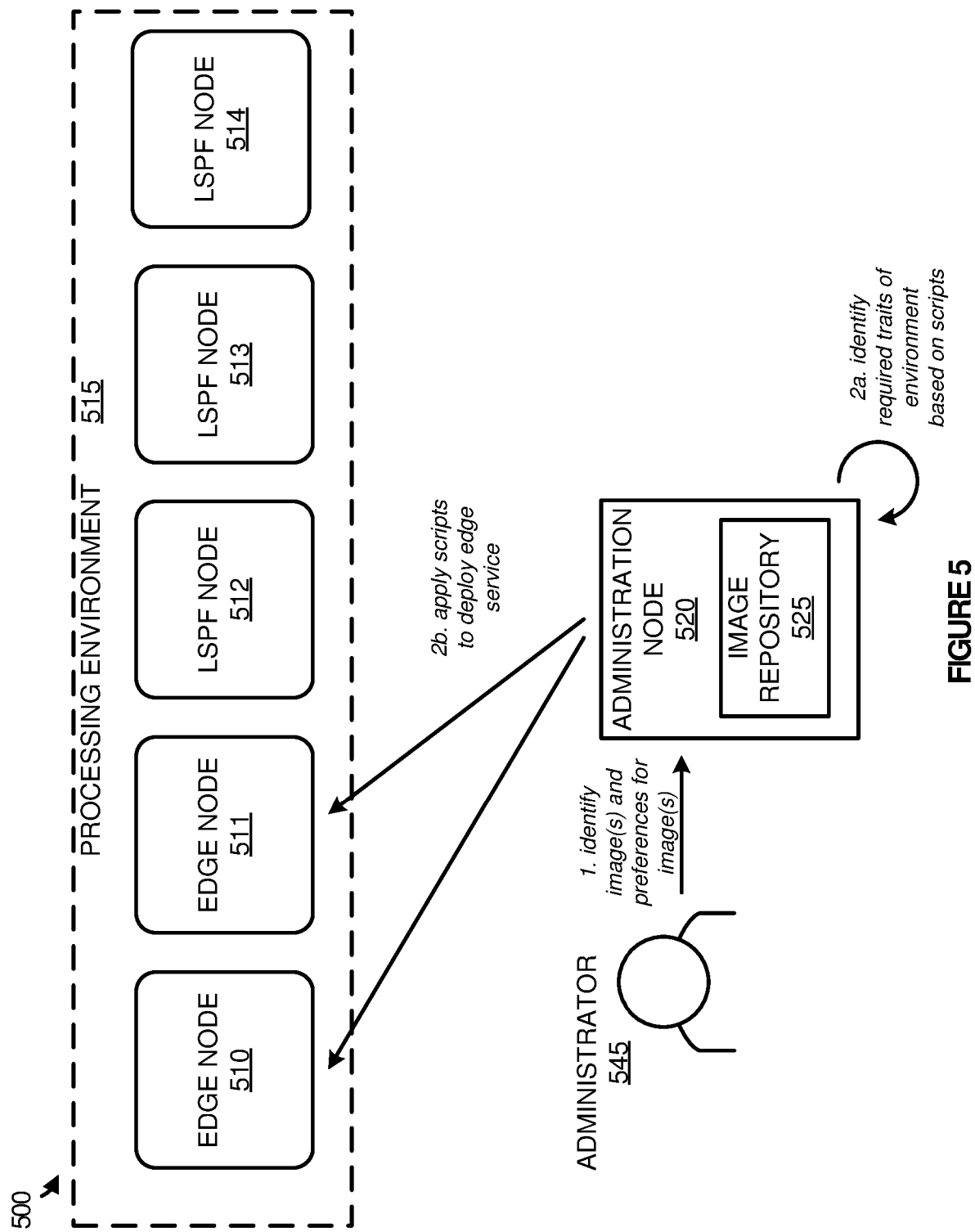
FIG. 5 illustrates an overview of deploying an edge large-scale processing framework service image according to one implementation.

FIG. 5 illustrates an overview 500 of deploying an edge LSPF service image according to one implementation. Overview 500 includes processing environment 515, administration node 520, and administrator 545. Processing environment 515 includes edge nodes 510-511 and LSPF nodes 512-514. Administration node 520 includes image repository 525, which includes LSPF service images that include scripts for deploying each of the images in processing environment 515. In some implementations, the images may be configured by an administrator of processing environment 515, such as administrator 545. In some implementations, at least a portion of image repository 525 may be downloaded or supplied from an image repository that is accessible by administrators and users of different processing environments. For example, a developer may generate an image with scripts as described here in and provide the image to be stored in a common repository accessible by administrators for different computing environments. Thus, an administrator of a first environment may download and deploy the image in the first environment, while an administrator of a second environment may download and deploy the image in the second environment.

Here, administrator 545, at step 1, identifies a request for one or more service images to be deployed in processing environment 515 and preferences for the one or more service images to be deployed in processing environment 515. These preferences may include the selection of processing resources to be provided to the services, the selection of a user group to be assigned to the images, the selection of data repositories for the images, or any other similar preference information related to the deployment of one or more services. In response to the preferences, administration node 520, at step 2a, identifies required runtime traits for the environment based on the scripts and the preferences provided by administrator 545. These traits may include, but are not limited to, addressing information for each of the nodes to be supplied to each of the services, processing resources to be provided to each of the nodes or services (processing cores, RAM, disk storage, etc.), and addressing information for other dependent LSPF services executing in processing environment 515. Once the required runtime traits are identified, administration node 520 may, at step 2*b*, apply the scripts associated with an image to deploy the services within processing environment 515. This applying of the scripts may include moving files and repositories into appropriate locations for each of the nodes, replacing variables in the files with the runtime information determined from the administrator preferences and the current state of the processing environment, or any other similar operations with respect to deploying the service in processing environment 515.

In the particular example of overview 500, administrator 545 selects an edge service from image repository 525 to be deployed in processing environment 515. In addition to selecting the edge image, administrator 545 may further provide other preferences, including the amount of processing resources to be allocated to the edge service, any addressing parameters for the edge service, and the like.

Once the edge service is selected and any associated parameters are provided, administration node 520 may identify any associated runtime traits based on the preferences provided from administrator 545 and the scripts associated with the selected edge service. In at least one implementation, once a service is selected, a script for the selected service may be executed to provide a user interface to administrator 545, permitting the administrator to select the preferences for the particular service. Once the preferences are provided, administration node 520 may continue executing the scripts associated with the image to identify the runtime traits for the image.

After the required traits are identified, in the present example, to deploy edge nodes 510-511, files may be moved to the appropriate location on the edge nodes, and variables may be updated based on the preferences of administrator 545, as well as resources allocated by administration node 520. These variables may include addressing variables for each edge node that makes up the service, memory allocation to each node in the service, or any other similar resource provided to the edge nodes. Additionally, because Administrator 545 selected an edge service, variables may also be updated on each edge node of edge nodes 510-511 to reflect information about LSPF nodes 512-514, which are representative of nodes for a cooperating service. Accordingly, administration node 520 may provide edge nodes 510-511 with addressing information for LSPF nodes 512-514, may provide edge nodes 510-511 with addressing information for data repositories used by LSPF nodes 512-514, or may provide edge nodes 510-511 with any other necessary information, including combinations thereof.

In some implementations, the scripts provided with a particular image may also include order of operations information regarding dependent or co-pending services within processing environment. For example, if the edge service, deployed in the example of FIG. 5 as edge nodes 510-511, required that the LSPF nodes be started and running in processing environment 515 before they began operation. The scripts may be used to prevent execution of the edge nodes until the LSPF nodes were operational. Thus, although administrator 545 may select both images to be deployed at the same time, the scripts associated with each of the images may be used to ensure that the services are executed at appropriate instances.

Figure 6:
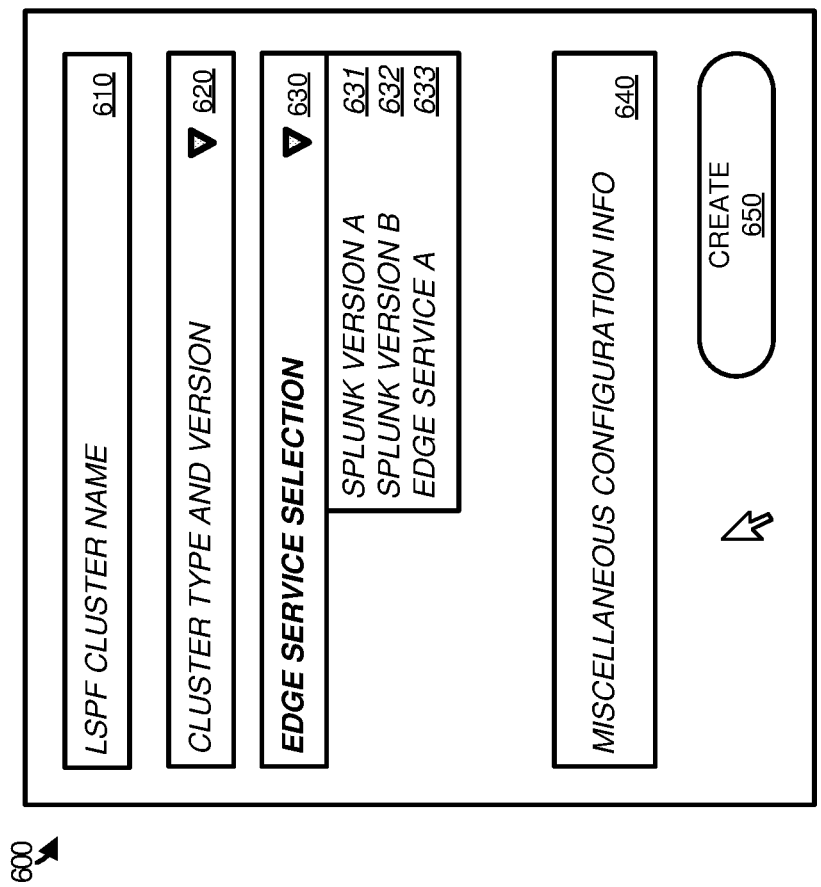
FIG. 6 illustrates a user interface to deploy large-scale processing framework service images according to one implementation.

FIG. 6 illustrates a user interface 600 to deploy LSPF service images according to one implementation. User interface 600 includes LSPF cluster name 610, cluster type and version 620, edge service selection 630, miscellaneous configuration information 640, and create object 650. Edge service selection 630 is representative of a drop down service capable of selecting Splunk versions A and B 631-632 and edge service A 633.

As described herein, an administration node may have access to a repository of LSPF service images capable of being deployed within a particular processing environment. To select the services for deployment in the processing environment a user interface, such as user interface 600 may be provided, wherein a user or administrator can select images and preferences associated with the images for deployment within the processing environment. Here, the administrator or user can select a cluster name in the field for LSPF cluster name 610, and select a cluster type and version using the field for cluster type and version 620. This cluster type and version may include a LSPF cluster such as a Hadoop or Spark cluster and version.

In addition to selecting a LSPF cluster that can distribute and process a large data set using the nodes assigned to the cluster, a user or administrator is also provided with an edge service selection 630, permitting the user to select an edge service that operates alongside the distributed functions of the LSPF cluster and can be used to manage and visualize operations by the LSPF cluster. In some examples, the edge services that are made available within edge service selection 630 includes only edge services that are compatible with the LSPF cluster that was selected. Accordingly, if a version of Hadoop were selected for the cluster, only services capable of being deployed with that particular version of Hadoop would be provided as a selection in edge service selection 630. In some implementations, the determination of which edge services are associated with a particular cluster service may be determined based on the metadata from an administrator or developer associated with the particular edge service. For example, for a version of Splunk, a developer may provide metadata that indicates one or more other services and clusters that are capable of being deployed with the particular version of Splunk.

In addition to selecting a cluster LSPF service and an edge service, the administrator or user may also select preferences for the services using miscellaneous configuration information 640. These preferences may include the number processing cores to be assigned to each of the services, the amount of memory to be assigned to each of the services, any data repositories to be associated with each of the services, or any other similar parameters for each of the services. In some implementations, the scripts associated with a selected service define the parameters that are provided for selection to the user or administrator, wherein the scripts are generated from metadata used in creating the image. For example, the metadata provided by a developer of a service may indicate that, when deployed, a user may specify the amount of processing resources to be allocated to a particular service. Accordingly, when an image is selected, the user may be provided with an interface capable of selecting the desired amount of processing resources. Once the miscellaneous configuration information 640 is provided, the administrator or user of a processing environment may deploy the services within the processing environment using create button 650. In response to the selection of deployment, an administration system may execute the required scripts to deploy each of the services within the processing environment. These scripts may be responsible for moving files and directories to their appropriate location on nodes selected for the services, and replacing variables in the files based on runtime information. This runtime information may be dictated by the user, using miscellaneous configuration information 640, and may also be assigned by the administration system at the time of deployment based on the current status of the processing environment.

Figure 7:
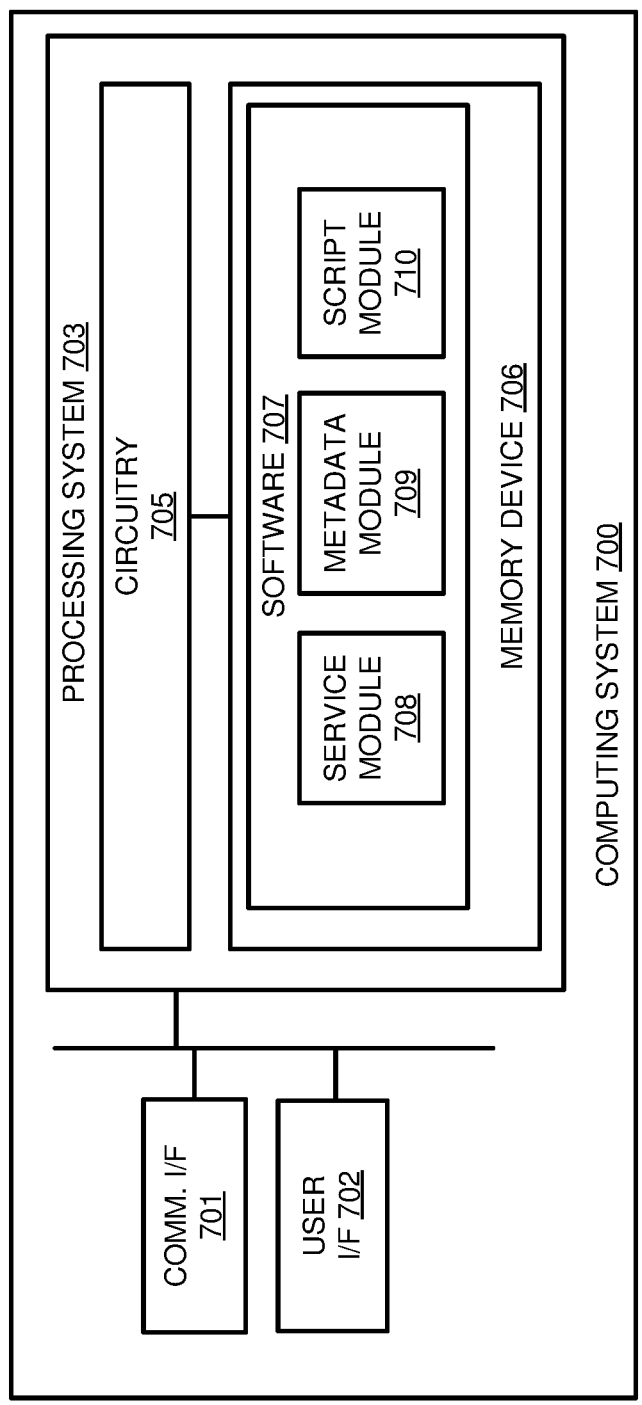
FIG. 7 illustrates a computing system to generate a large-scale processing framework service image according to one implementation.

FIG. 7 illustrates a computing system 700 to generate a large-scale processing framework service image according to one implementation. Computing system 700 is representative of any computing system or systems with which the various operational architectures, processes, scenarios, and sequences disclosed herein for generating service images for LSPF processing environments may be employed. Computing system 700 is an example of administration node 120 from FIG. 1, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as batteries and enclosures that are not shown for clarity. Computing system 700 may comprise one or more servers, personal computers, routers, or some other computing apparatus, including combinations thereof.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes service module 708, metadata 709, and script module 710, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, service module 708, when read and executed by processing system 703, directs processing system 703 to identify a first LSPF service image for a LSPF service, wherein the LSPF service may comprise a LSPF cluster image, such as Hadoop, or an edge service image, such as Splunk. In addition to identifying an image, metadata module 709 directs processing system 703 to identify metadata that defines runtime requirements for deploying the LSPF service in a data processing environment. These runtime requirements may include runtime addressing information for each of the nodes of the service, processing resources that are allocated at runtime to the service, or any other similar runtime information.

Once the image is identified along with the metadata, script module 710 directs processing system 703 to generate scripts for deploying the service in a processing environment based on the provided metadata. In some implementations, the metadata provided by a developer or administrator may be generated in the form of one or more metadata files in a API format. Based on the metadata in the API format, script module 710 may translate the one or more files into scripts that can be used to deploy the desired service. After the scripts are generated, service module 708 further directs processing system 703 to generate a second LSPF service image for the LSPF service, wherein the second LSPF service image includes the generated scripts.

In some implementations, an administrator of a particular processing environment may generate the second service image and store the image in a local repository. This configuration permits users and administrators to deploy the image with the script files as required. Additionally, the generated image may be uploaded or stored in a centralized repository where administrators and users of other processing environments may access the image and deploy the service within their own processing environments. In other implementations, a developer of a LSPF service may generate an image with the scripts, and store the image in a repository that is available to administrators and users of a plurality of processing environments. Consequently, the administrators and users may select the services that are desired from the repository to be deployed in their respective processing environment.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of preparing service images for large data processing environments, the method comprising:
in a processing system, identifying a first service image for a service;
identifying metadata that defines runtime requirements for deploying the service in data processing environments, wherein the runtime requirements for deploying the service comprise dependent characteristics of at least one cooperating service to be executed as one or more virtual nodes in a processing environment with the service, and wherein the dependent characteristics comprise addressing information for the at least one cooperating service;
generating scripts for deploying the service based on the metadata, wherein the scripts comprise operations to configure the service to communicate with the cooperating service;
generating a second service image for the service, wherein the second service image includes the scripts; and
deploying the second service as one or more virtual nodes via the second service image with the at least one cooperating service in the processing environment.

2. The method of claim 1 wherein the service comprises a large scale processing framework (LSPF) service.

3. The method of claim 1 wherein the runtime requirements for deploying the service in the data processing environments further comprise internet protocol addressing requirements for the service and computing resource requirements for the service.

4. The method of claim 3 wherein the computing resource requirements comprise at least processing and memory resource requirements for the service.

5. The method of claim 1 wherein the cooperating service comprises a cooperating large scale processing framework service.

6. The method of claim 1 wherein the cooperating service comprises a distributed computing service.

7. The method of claim 1 wherein the at least one cooperating service comprises an analytics service.

8. The method of claim 1 further comprising:
identifying a user selection to deploy the service; and
executing the scripts of the second service image to identify runtime characteristics of the data processing environment and move files associated with the service to nodes allocated to the service.

9. The method of claim 1 further comprising storing the second service image in a service repository accessible by users and administrators of a plurality of data processing environments.

10. The method of claim 1 wherein the metadata comprises one or more metadata files in an application program interface (API) format, and wherein generating the scripts for deploying the service based on the metadata comprises translating the one or more metadata files in the API format into the scripts for deploying the service.

11. A computing apparatus comprising:
one or more non-transitory computer readable storage media;
a processing system operatively coupled with the one or more non-transitory computer readable storage media; and
program instructions stored on the one or more non-transitory computer readable storage media to prepare service images for large data processing environments that, when read and executed by the processing system, direct the processing system to at least:
identify a first service image for a service;
identify metadata that defines runtime requirements for deploying the service in data processing environments, wherein the runtime requirements for deploying the service comprise dependent characteristics of at least one cooperating service to be executed as one or more virtual nodes in a processing environment with the service, and wherein the dependent characteristics comprise addressing information for the at least one cooperating service;
generate scripts for deploying the service based on the metadata, wherein the scripts comprise operations to configure the service to communicate with the cooperating service;
generate a second service image for the service, wherein the second service image includes the scripts; and
deploy the second service as one or more virtual nodes via the second service image with the at least one cooperating service in the processing environment.

12. The computing apparatus of claim 11 wherein the service comprises a large scale processing framework service.

13. The computing apparatus of claim 11 wherein the runtime requirements for deploying the service in the data processing environments comprise internet protocol addressing requirements for the service and computing resource requirements for the service.

14. The computing apparatus of claim 13 wherein the computing resource requirements comprise at least processing and memory resource requirements for the service.

15. The computing apparatus of claim 11 wherein the cooperating service comprises a large scale processing framework service.

16. The computing apparatus of claim 11 wherein the service comprises a distributed computing service and wherein the cooperating service comprises an analytics service.

17. The computing apparatus of claim 11 wherein the at least one cooperating service comprises a Hadoop or a Spark service.

18. The computing apparatus of claim 11 wherein the metadata comprises one or more metadata files in an application program interface (API) format, and wherein the program instructions to generate the scripts for deploying the service based on the metadata direct the processing system to translate the one or more metadata files in the API format into the scripts for deploying the service.

19. An apparatus comprising:
one or more non-transitory computer readable storage media;
program instructions stored on the one or more non-transitory computer readable storage media to prepare large scale processing framework service images for large scale data processing environments that, when read and executed by a processing system, direct the processing system to at least:
identify a first service image for a service;
identify metadata that defines runtime requirements for deploying the service in data processing environments, wherein the runtime requirements for deploying the service comprise dependent characteristics of at least one cooperating service to be executed as one or more virtual nodes in a processing environment with the service, and wherein the dependent characteristics comprise addressing information for the at least one cooperating service;

generate scripts for deploying the service based on the metadata, wherein the scripts comprise operations to configure the service to communicate with the cooperating service;

generate a second service image for the service, wherein the second service image includes the scripts; and deploy the second service as one or more virtual nodes via the second service image with the at least one cooperating service in the processing environment.

20. The apparatus of claim 19 wherein the runtime requirements for deploying the service in the data processing environment comprise internet protocol addressing requirements for the service and computing resource requirements for the service.

* * * * *